United States Patent
Bratten (10) Patent No.: US 6,612,445 B2
(45) Date of Patent: Sep. 2, 2003

(54) INDUSTRIAL FILTER WITH ARRANGEMENT FOR REMOVING MACHINING CHIPS FROM COOLANT PRIOR TO FILTERING

(76) Inventor: Jack R. Bratten, 5970 St. James Dr., West Bloomfield, MI (US) 48322

( * ) Notice: Subject to any disclaimer, the term of this patent is extended or adjusted under 35 U.S.C. 154(b) by 0 days.

(21) Appl. No.: 09/821,814

(22) Filed: Mar. 29, 2001

(65) Prior Publication Data

US 2002/0139722 A1 Oct. 3, 2002

(51) Int. Cl.[7] .................. B07B 1/10; B01D 33/056; B01D 35/12
(52) U.S. Cl. .................. 209/272; 209/307; 210/327; 210/335; 210/401; 210/783
(58) Field of Search .................. 209/307, 272, 209/308, 268, 234, 17; 210/783, 327, 335, 401

(56) References Cited

U.S. PATENT DOCUMENTS

| | | | | |
|---|---|---|---|---|
| 3,087,620 A | * | 4/1963 | Hirs | 210/396 |
| 3,327,886 A | * | 6/1967 | Pall | 210/493 |
| 3,780,872 A | * | 12/1973 | Pall | 210/493 |
| 4,192,747 A | * | 3/1980 | Wykoff | 210/83 |
| 4,201,675 A | * | 5/1980 | Damerau | 210/387 |
| 4,250,036 A | * | 2/1981 | Parshall | 210/297 |
| 4,448,683 A | * | 5/1984 | Green | 210/106 |
| 4,661,251 A | * | 4/1987 | Wykoff | 210/396 |
| 4,715,964 A | * | 12/1987 | Harms | 210/783 |
| 4,865,724 A | * | 9/1989 | Brandt et al. | 210/104 |
| 5,059,323 A | * | 10/1991 | Galletti | 210/400 |
| 5,118,420 A | * | 6/1992 | Galletti | 6/199 |
| 5,256,290 A | * | 10/1993 | Becker et al. | 210/400 |
| 5,417,850 A | * | 5/1995 | Schimion et al. | 210/111 |
| 5,477,891 A | * | 12/1995 | Benesi | 139/383 R |
| 5,601,729 A | * | 2/1997 | Bratten | 210/783 |
| 5,624,579 A | * | 4/1997 | Bratten | 210/783 |
| 5,961,847 A | * | 10/1999 | Creps et al. | 210/783 |
| 6,093,315 A | * | 7/2000 | Croket | 210/168 |
| 6,241,879 B1 | * | 6/2001 | Kato et al. | 210/106 |

* cited by examiner

Primary Examiner—Donald P. Walsh
Assistant Examiner—Daniel K Schlak
(74) Attorney, Agent, or Firm—John R. Benefiel (57) ABSTRACT

An arrangement for removing chips from a machining coolant prior to filtering out the finer solids in a main filter. A coarse weave belt is frictionally driven along a strainer bottom wall of an auxiliary tank suspended above the main filter tank, the permanent media belt of a coarse weave which allows the liquid and suspended finer solids to pass through while capturing the chips. A powered drag conveyor frictionally engages and drives the permanent media belt through the auxiliary tank, each diverging when returning across the top and bottom respectively of the auxiliary tank prior to being recirculated through the auxiliary tank.

11 Claims, 3 Drawing Sheets

INDUSTRIAL FILTER WITH ARRANGEMENT FOR REMOVING MACHINING CHIPS FROM COOLANT PRIOR TO FILTERING

BACKGROUND OF THE INVENTION

This invention concerns industrial filters used primarily in metalworking plants to filter machining coolants to remove chips, grinding and tool wear detritus, etc., so that the coolant can be reused.

These solids to be removed include large volumes of machined chips of relatively large size, and a smaller volume of much finer particles. Vacuum filters are widely used to filter such liquids, and involve the use of woven belts overlying a perforated top vacuum box disposed at the bottom of an open tank which receives the coolant to be filtered.

Disposable sheet paper media is sometimes used to improve filter performance overlying the belt, which collects the solids and is periodically indexed out for disposal. Disposal of the paper media creates a maintenance labor burden as well as an environmental burden.

The vacuum box draws the coolant through the porous belt and/or disposable media to be filtered. The filter belt is typically overlain with a drag conveyor which is periodically advanced to move accumulations of chips on top of the belt out of the tank. The belt itself is periodically indexed with the conveyor so as to be able to be washed to clean off the filtrate. The more frequent the filter belt is indexed, the shorter its service life, and the index cycle itself interrupts filter operation reducing its capacity. Some build-up of filtered solids is desirable as this improves the clarity of the filtered liquid, as the filter "cake" acts as an additional filtering media. Frequent indexing reduces this beneficial effect as the solids accumulation is reduced. The machining chips rapidly accumulate in large volumes if left in the coolant when filtered, which necessitates frequent indexing. The presence of sharp metal chips on the belt also may cause the drag conveyor to tear holes in the belt by pulling the sharp metal chips along the belt surface.

It has therefore previously been recognized that it is advantageous to remove the machining chips prior to filtration to remove the fine solid particles from the used coolant.

When iron and steel chips are involved, settling tanks ahead of the filter have been used effectively, as these chips are heavy and settle out rapidly. Magnetic separators have also been used to remove iron and steel chips prior to filtration by vacuum filters.

However, in the auto and other industries, machining of aluminum has become much more widespread. Aluminum chips, being much lighter, do not settle out as well such that this approach is not effective. Magnetic separators likewise do not work with aluminum chips.

For these applications, passing the liquid through a wedgewire or perforated plate strainer has been employed to remove the chips prior to filtration in a main filter. Wedgewire is made by welding triangular in section strands of wire in parallel spaced apart arrays onto transversely extending bars to provide a slotted strainer plate. The used coolant containing the chips is directed into a smaller tank which has a wedgewire bottom plate mounted within in the upper part of the vacuum filter tank. The liquid passes out of the smaller tank through the wedgewire bottom plate and passes into the main filter tank, leaving most of the chips behind. A drag conveyor is continuously moved along the wedgewire bottom plate to carry away the chips accumulating above the wedgewire plate.

While this arrangement does remove most aluminum chips, if the wedgewire strand spacing too close, some of these chips tend to be jammed into the spaces, this tendency exacerbated by the action of the drag conveyor flights which tend to push the chips into the spaces and to deform the exposed ends over, making it difficult to clear these chips from between the wedgewire strands.

Over time, the wedgewire becomes clogged, and this necessitates periodic extended shutdowns to access the wedgewire bottom plate for cleaning. It is a difficult and time consuming process to remove the accumulated jammed chips.

For this reason, the wedgewire spacing has been increased in an attempt to minimize the tendency for clogging the same with the chips, but in this situation, many chips pass through to the filter belt, increasing the rate at which indexing must be done. If indexing is done more frequently, this reduces the average accumulation of fine solids on the belt, and this in turn decreases the clarity of the filtered coolant.

It is the object of the present invention to provide an arrangement for removing machining chips from used coolant prior to filtering the coolant in a vacuum filter, which arrangement effectively removes a very high proportion of the chips from the coolant, which arrangement is effective for removing aluminum chips, and which does not entail a substantial maintenance burden.

SUMMARY OF THE INVENTION

The above object and others which will be understood upon a reading of the following specification and claims are achieved by providing a recirculating coarse weave permanent filter belt which runs over the top of a strainer plate forming the bottom of an auxiliary tank suspended in the upper region of a main filter tank. The wedgewire strand spacing is wide enough to minimize any tendency to capture the machining chips. The permanent filter belt is returned around the bottom of the auxiliary tank. The filter belt weave is open enough to allow the suspended solids to freely pass through with the used coolant while capturing a great proportion of the metal chips. The filter belt is frictionally driven by engagement with a continuously driven drag flight conveyor which runs along the upper surface of the belt, and returns back over the top of the auxiliary tank in being recirculated, so as to diverge from the filter belt when both are being returned. The belt is preferably a coarse twill weave with the "one over" side engaged by the conveyor flights to establish a nonslipping positive engagement with the belt so that any tendency to drive the chips into the belt is avoided. The secure engagement between the conveyor flights and the filter belt allows the belt to be reliably driven without slippage despite being pressed onto the wedgewire tank bottom by the weight of the coolant liquid and chips bearing on it. The divergent return paths of the flight conveyor and filter belt insure that different belt areas contact the flights when engagement occurs to distribute the belt wear resulting from engagement with the conveyor flights, which, together with the nonslip engagement therebetween, greatly increases the filter belt service life.

A sloping shed plate is interposed below the wedgewire plate and the return section of the filter belt to allow the liquid passing through the filter belt and wedgewire plate to be directed to either side of the permanent filter belt and into the main filter tank.

A variable speed drive from the flight conveyor enables a manual or automatic variance in conveyor speed to accommodate changes in the chip load.

The fine solids passed through the chip removing arrangement are thus allowed to build up on the primary filter belt to improve the clarity of the filtered liquid, as the primary filter does not need to be indexed nearly as often as with the prior arrangements due to the great reduction in chip volume that must be handled by the main filter, which result increases the service life of the main filter permanent filter belt.

DETAILED DESCRIPTION

In the following detailed description, certain specific terminology will be employed for the sake of clarity and a particular embodiment described in accordance with the requirements of 35 USC 112, but it is to be understood that the same is not intended to as limiting and should not be so construed inasmuch as the invention is capable of taking many forms and variations within the scope of the appended claims.

Figure 1:
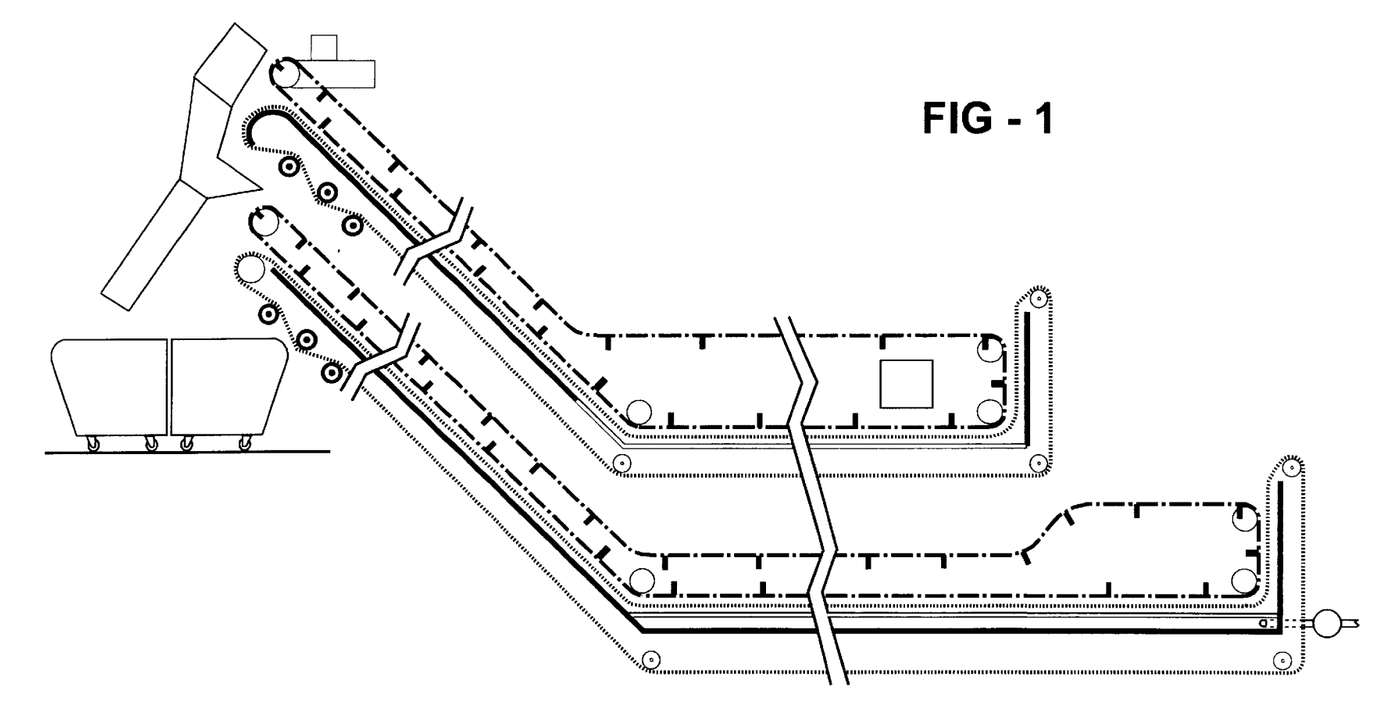
FIG. 1 is a diagrammatic representation of a vacuum filter combined with an arrangement according to the invention for prefiltering removal of machining chips.

The chip removal arrangement 10 according to the present invention shown in FIG. 1 is combined with a vacuum filter 12 of a type shown in U.S. Pat. No. 5,624,579 by the inventor of the present application.

Figure 2:
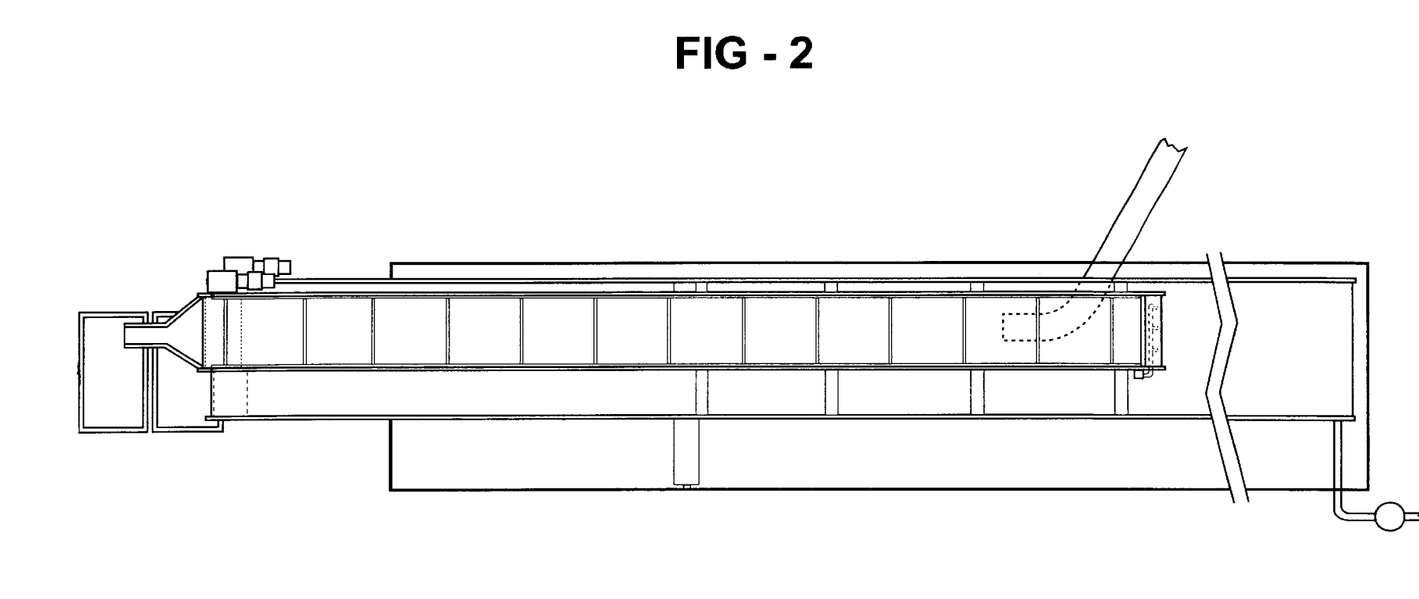
FIG. 2 is a plan view of the apparatus shown in FIG. 1.

A main tank 14 is provided to receive coolant to be filtered, but the dirty liquid inlet trench 16 (FIG. 2) first enters an auxiliary tank 18 associated with the chip removal arrangement 10, the coolant liquid draining through a strainer bottom wall 20 (constructed of a wedgewire plate), and into the main tank 14.

The main filter 12 includes a permanent media belt 22 circulated over the top 24 of a vacuum box which has openings (such as by a wedgewire plate) allowing liquid to be drawn through the overlying segment of the permanent media belt 22 and into a vacuum box interior 26 by a pump 28 returning clean liquid to the coolant supply system.

The permanent media belt 22 is recirculated up a sloping end wall 30 of the main tank 14 by a frictional engagement with a segment of a drag conveyor 32 powered with a drive unit 34.

The permanent media belt 22 is recirculated around the bottom of the main tank 14 after passing through a scraper-washer 36 mechanism. A collector hopper 38 is positioned below to catch the debris scraped from the permanent media belt 22 (and the disposable media if used as described below).

The permanent media belt reenters the tank 14 out the other end of the main tank 14, passing down the tank vertical end wall 40. The drag conveyor 32 returns back over the top, supported by a series of guides (not shown).

A disposable media roll (not shown) may be mounted above that point to allow disposable media to be fed in between the drag conveyor 32 and the permanent media belt 22 to be driven together with the permanent media belt across the vacuum box 26, as described in U.S. Pat. No. 5,624,579.

The chip removal arrangement 10 according to the present invention includes the auxiliary tank 18 having the strainer bottom wall 20.

An auxiliary permanent media belt 46 is arranged to be frictionally driven across the wedgewire bottom wall 20 by an auxiliary drag flight conveyor 48 having a segment overlying the wedgewire bottom wall 20.

The auxiliary permanent media belt 46 is of a twill weave referred to as "1 over, 2 under", and of a coarse grade. The weave is sufficiently open to allow the fine solids to freely pass through while capturing the chips, which are much larger. The spacings in the wedgewire bottom wall 20 are also sufficiently wide to allow the solids to pass through (as well as any chips not captured by the belt 46). The permanent filter belt 46 has one side (the "one over" side) which will be much more positively engaged by the inclined edge of the conveyor flights 50 (FIG. 4) which side is therefor arranged to be facing up over the wedgewire strainer bottom wall 20. The flights 50 are preferably inclined towards the direction of movement of the conveyor 48 as shown, as this has been found to improve the engagement therewith. This allows the permanent media belt 46 to be positively frictionally driven despite the combined weight of the coolant and chips 49 bearing thereon. As is well known, the orientation of the wedgewire strands 21 (FIG. 3), with the flat of the triangle facing up also reduces wear on the permanent media belt 46.

The drag conveyor 48 and permanent media belt 46 together ascend a sloping exit wall 52 of the tank 18, diverging away from each other at the top thereof, the permanent media belt 46 then recirculated back around the bottom of the tank 18 guided on a series of guide rollers 54, while the drag conveyor 48 is returned back over the top of the tank 18. A variable speed drive 58 with a manual or automatic control 60 allows the speed of the drag conveyor 48 (and permanent media belt 46) to be varied in correspondence to the chip load. The drive 58 preferably operates continuously to carry away the captured chips as they accumulate.

A belt washer header 62 (FIG. 2) is also preferably provided, with an array of spray nozzles 64 directed at the belt 46 as it ascends the rear wall of the tank 18 to keep it clear of accumulated solids, which are discharged into the used coolant in the main tank 12.

Figure 3:
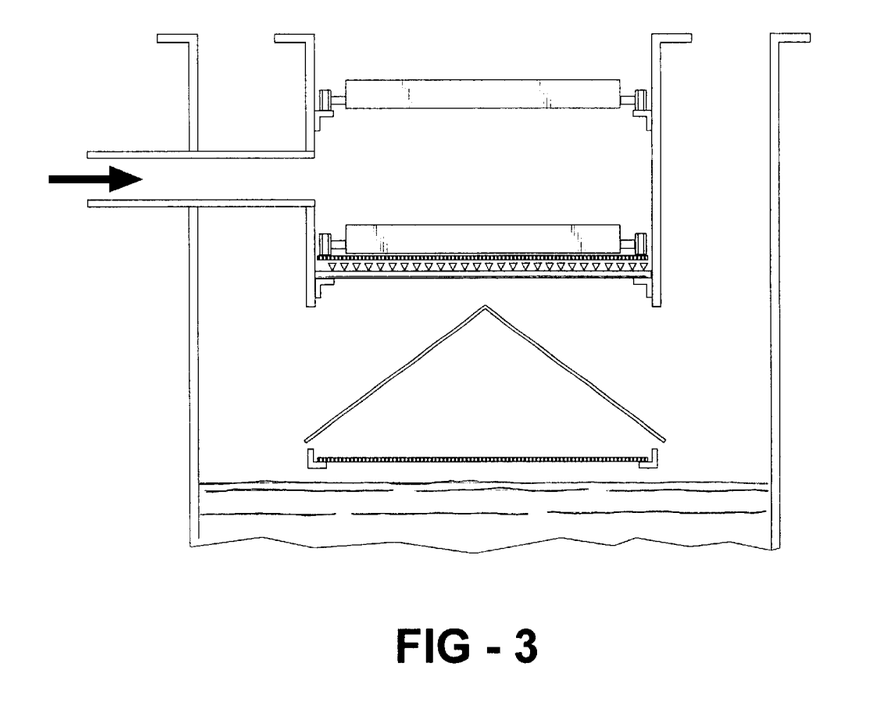
FIG. 3 is a fragmentary cross-sectional view of a portion of the apparatus shown in FIG. 1.
Figure 4:
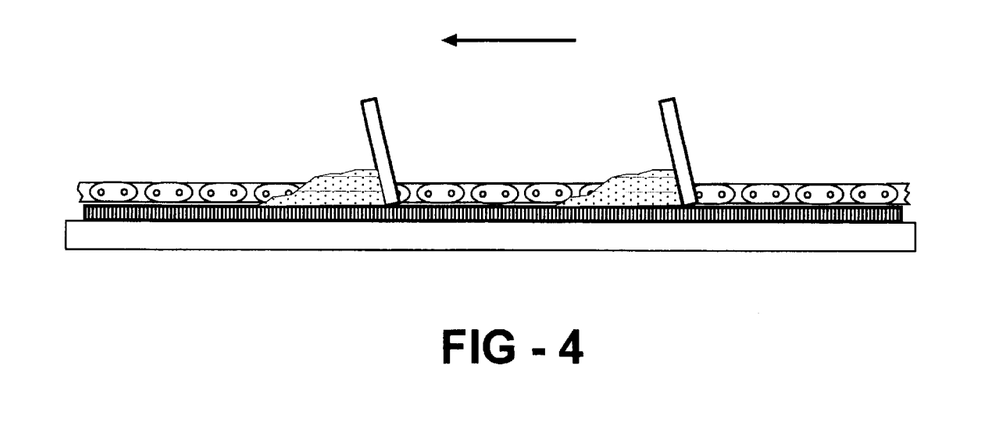
FIG. 4 is an enlarged side view of the engagement of the drag conveyor flights and the permanent media belt included in the chip removal arrangement according to the present invention.

FIG. 3 shows a drain shield 66 disposed below the wedgewire 20 and serving to direct liquid around either side of the return segment 46A of the auxiliary permanent media belt 46.

The chips are discharged at the top of the sloping wall 52 as the flight drag conveyor 48 and permanent media belt 46 diverge and reverse paths, directed by a discharge guide chute 68 (FIG. 1) into a chip hopper 70 for further handling.

Accordingly, the chips are captured by the continuously moving drag conveyor 48 and permanent media belt 46, such that chip build up in the wedgewire plate 20 does not occur. The remaining solids, being typically present in much smaller volumes, do not need to be removed at frequent intervals and a build up can be allowed. This produces enhanced clarity of the filtered liquid, and reduces the frequency of cycling of the filter belt 22 to increase its service life.

Since the drag conveyor 48 and permanent media belt 46 do not move relative each other to any significant degree, wear of the permanent media belt 46 is minimized, and driving chips into the auxiliary permanent media belt 46 is also avoided so that spray washing of the permanent media belt 46 can keep it clean. Since the conveyor flights 50 randomly engage different points on the permanent media belt 46 when reengaging the same, the wear that does occur is distributed over the permanent media belt 46.

While a wedgewire strainer plate 20 is shown and preferred, other strainer plate configurations can be used, such as perforated plate, as long as the openings are sufficiently large to allow passage of the solids.

What is claimed is:

1. A combination filter for separately removing machining chips from a liquid prior to filtering the liquid to remove finer solids, said combination comprising:

an auxiliary filter having an auxiliary tank mounted over said main tank, said auxiliary tank having a bottom strainer wall having openings allowing liquid containing said finer solids to be filtered in said main tank to pass freely through said openings to be received in the main tank;

a continuous loop permanent media belt extending through said auxiliary chip receiving tank, said bottom strainer wall, and out of said auxiliary tank, and returning beneath said bottom strainer wall, said permanent media belt having a weave sufficiently open to allow said liquid and solids to pass therethrough while being tight enough to capture said chips;

a drag conveyor circulated through said auxiliary tank, and engaging a segment of said permanent media belt overlying said bottom strainer wall, and a drive for advancing said drag conveyor which advancement of said drag conveyor also advancing said permanent media belt by said engagement with said drag conveyor, said chips captured by said permanent media belt segment carried out of said auxiliary tank by advancement of said drag conveyor and permanent media belt to a collection point adjacent said main tank; and, a main filter including a main tank having vacuum box at the bottom of said main filter tank, said vacuum box having a top formed with openings and a main filter media circulated over said vacuum box top sufficiently fine to be able to filter out said solids, liquid in said main tank drawn through said media belt and into said vacuum box to filter said finer solids from said liquid received from said auxiliary filter.

2. The combination according to claim 1 wherein said strainer bottom wall is formed by lengthwise extending spaced apart wedgewire strands.

3. The combination according to claim 1 wherein said permanent media belt is of a one over two under twill weave with said drag conveyor having flights engaged with said one over side.

4. The combination according to claim 1 wherein said auxiliary tank is mounted within an upper region of said main tank.

5. The combination according to claim 1 further including a belt washer directing jets of clean liquid at said permanent media belt prior to reentering said auxiliary tank.

6. The combination according to claim 1 wherein said auxiliary tank has a sloping exit wall, up which said permanent media belt is driven by said drag conveyor in exiting said auxiliary tank.

7. The combination according to claim 1 wherein said continuous media belt has a return segment extending beneath said auxiliary tank and said drag conveyor has a return segment extending over the top of said auxiliary tank.

8. The combination according to claim 7 further including a deflector shield mounted between the underside of said bottom wall and said return of said permanent media belt to cause liquid containing said finer solids passing through said bottom strainer wail of said auxiliary filter tank drain to either side of said return segment of said permanent media belt of said auxiliary filter and into said main tank.

9. The combination according to claim 1 wherein said powered drag conveyor frictionally engages said permanent media belt to recirculate the same through said auxiliary tank.

10. The combination according to claim 9 wherein said drag conveyor drive is continuously driven to continuously drive said drag conveyor and said permanent media belt to be recirculated through said auxiliary tank.

11. The combination according to claim 9 wherein said drag conveyor drive is of a variable speed to drive said drag conveyor and permanent media belt at varying speeds.

* * * * *

UNITED STATES PATENT AND TRADEMARK OFFICE
CERTIFICATE OF CORRECTION

PATENT NO.       : 6,612,445 B2                                     Page 1 of 4
APPLICATION NO. : 09/821814
DATED            : September 2, 2003
INVENTOR(S)      : Jack R. Bratten It is certified that error appears in the above-identified patent and that said Letters Patent is hereby corrected as shown below:

Drawings are missing the corresponding reference numbers.

Please see attach drawings please insert

Signed and Sealed this

Thirteenth Day of March, 2007

JON W. DUDAS
*Director of the United States Patent and Trademark Office*